(12) United States Patent
Mager

(10) Patent No.: US 8,943,404 B1
(45) Date of Patent: Jan. 27, 2015

(54) SELECTIVE DISPLAY OF PRONUNCIATION GUIDES IN ELECTRONIC BOOKS

(75) Inventor: Rainer V. Mager, Tokorozawa (JP)

(73) Assignee: Amazon Technologies, Inc., Reno, NV (US)

( * ) Notice: Subject to any disclaimer, the term of this patent is extended or adjusted under 35 U.S.C. 154(b) by 232 days.

(21) Appl. No.: 13/345,452

(22) Filed: Jan. 6, 2012

(51) Int. Cl.
*G06F 15/00* (2006.01)

(52) U.S. Cl.
USPC ........................................................ 715/256

(58) Field of Classification Search
CPC ...................................................... G06F 15/00
USPC ........................................................ 715/256
See application file for complete search history.

(56) References Cited

U.S. PATENT DOCUMENTS

| | | | |
|---|---|---|---|
| 4,764,976 A | 8/1988 | Kallin et al. | |
| 5,146,552 A | 9/1992 | Cassorla et al. | |
| 5,359,514 A | 10/1994 | Manthuruthil et al. | |
| 5,486,111 A | 1/1996 | Watkins | |
| 5,649,826 A | 7/1997 | West et al. | |
| 5,957,693 A | 9/1999 | Panec | |
| 6,370,498 B1 | 4/2002 | Flores et al. | |
| 6,438,515 B1 | 8/2002 | Crawford et al. | |
| 6,683,611 B1 | 1/2004 | Cleveland | |
| 6,816,830 B1 | 11/2004 | Kempe | |
| 6,953,343 B2 | 10/2005 | Townshend | |
| 7,136,877 B2 | 11/2006 | Volcani et al. | |
| 7,270,546 B1 * | 9/2007 | Adams et al. | 434/178 |
| 7,313,513 B2 | 12/2007 | Kinder | |
| 7,386,453 B2 * | 6/2008 | Polanyi et al. | 704/270 |
| 7,483,871 B2 | 1/2009 | Herz | |
| 7,801,721 B2 | 9/2010 | Rosart et al. | |
| 7,801,896 B2 | 9/2010 | Szabo | |
| 7,818,164 B2 | 10/2010 | Wood et al. | |
| 7,905,391 B1 | 3/2011 | Shilling | |
| 7,912,717 B1 | 3/2011 | Galick | |
| 7,974,714 B2 | 7/2011 | Hoffberg | |
| 8,171,032 B2 | 5/2012 | Herz | |
| 2002/0120635 A1 | 8/2002 | Joao | |
| 2002/0182578 A1 | 12/2002 | Rachman et al. | |
| 2002/0199166 A1 | 12/2002 | Volcani et al. | |
| 2003/0068603 A1 | 4/2003 | Cupp | |
| 2003/0093275 A1 | 5/2003 | Polanyi et al. | |
| 2003/0152894 A1 | 8/2003 | Townshend | |
| 2004/0067472 A1 | 4/2004 | Polanyi et al. | |
| 2004/0117728 A1 | 6/2004 | Gromer | |
| 2004/0253568 A1 | 12/2004 | Shaver-Troup | |

(Continued)

OTHER PUBLICATIONS

Final Office Action for U.S. Appl. No. 12/165,049, mailed on Sep. 1, 2011, John Lattyak, "Providing Progressive Language Conversion for Digital Content on an Electronic Device" 14 pages.

(Continued)

*Primary Examiner* — Adam M Queler
*Assistant Examiner* — Tionna Burke
(74) *Attorney, Agent, or Firm* — Lee & Hayes, PLLC

(57) ABSTRACT

Techniques for selectively and dynamically determining an amount of pronunciation guides to display within an electronic book based at least in part on an aspect of a user. For instance, an electronic device rendering an electronic book may determine whether to display some, all, or no pronunciation guides for characters within the electronic book based on a reading level of the user, an age of the user, a primary language of the user, or any other aspect that indicates the user's proficiency in the language of the electronic book.

23 Claims, 8 Drawing Sheets

(56) References Cited

U.S. PATENT DOCUMENTS

| | | | |
|---|---|---|---|
| 2005/0027664 A1 | 2/2005 | Johnson et al. | |
| 2005/0039121 A1* | 2/2005 | Cleveland | 715/517 |
| 2005/0131762 A1 | 6/2005 | Bharat et al. | |
| 2005/0193335 A1 | 9/2005 | Dorai et al. | |
| 2007/0011005 A1 | 1/2007 | Morrison et al. | |
| 2007/0067294 A1 | 3/2007 | Ward et al. | |
| 2007/0292826 A1 | 12/2007 | Goddy et al. | |
| 2008/0070205 A1 | 3/2008 | Amick et al. | |
| 2008/0140412 A1 | 6/2008 | Millman et al. | |
| 2008/0141117 A1 | 6/2008 | King et al. | |
| 2008/0229190 A1 | 9/2008 | Johnson | |
| 2009/0092952 A1 | 4/2009 | Schlanger et al. | |
| 2009/0246744 A1 | 10/2009 | Lofthus et al. | |
| 2009/0263778 A1 | 10/2009 | Berger et al. | |
| 2010/0153889 A1 | 6/2010 | Krause | |
| 2010/0299205 A1 | 11/2010 | Erdmann et al. | |
| 2011/0175805 A1 | 7/2011 | Rottler et al. | |
| 2011/0261030 A1 | 10/2011 | Bullock | |
| 2011/0306023 A1 | 12/2011 | Blank et al. | |
| 2012/0030587 A1 | 2/2012 | Ketkar | |
| 2012/0047455 A1 | 2/2012 | Yuan et al. | |
| 2012/0088211 A1 | 4/2012 | Massaro | |
| 2012/0173659 A1 | 7/2012 | Thaxter et al. | |
| 2012/0233539 A1 | 9/2012 | Reed | |
| 2012/0293529 A1* | 11/2012 | Che et al. | 345/589 |
| 2013/0080881 A1 | 3/2013 | Goodspeed et al. | |
| 2013/0097164 A1 | 4/2013 | Welinder et al. | |
| 2014/0019553 A1 | 1/2014 | Bill | |

OTHER PUBLICATIONS

U.S. Appl. No. 12/165,049, filed Jun. 30, 2008, Lattyak, et al., "Providing Progressive Language Conversion for Digital Content on an Electronic Device".

U.S. Appl. No. 12/853,038, filed Aug. 9, 2010, Daniel B. Rausch, "Providing Electronic Books According to Reading Capability".

Office action for U.S. Appl. No. 12/853,038, mailed on Dec. 21, 2012, Rausch, "Providing Electronic Books According to Reading Capability", 15 pages.

Non-Final Office Action for U.S. Appl. No. 12/165,049, mailed on May 1, 2012, John Lattyak, "Providing Progressive Language Conversion for Digital Content on an Electronic Device" 15 pages.

Final Office action for U.S. Appl. No. 12/165,049 mailed on Aug. 28, 2012, Lattyak, "Providing Progressive Language Conversion for Digital Content on an Electronic Device", 21 pages.

Office action for U.S. Appl. No. 12/853,076, mailed on Mar. 14, 2013, Rausch, "Determining Reading Levels of Electronic Books", 13 pages.

Final Office Action for U.S. Appl. No. 12/853,038, mailed on May 22, 2013, Rausch, "Providing Electronic Books According to Reading Capability", 19 pages.

Office action for U.S. Appl. No. 12/853,076, mailed on Aug. 22, 2013, Rausch, "Determining Reading Levels of Electronic Books", 10 pages.

Office action for U.S. Appl. No. 12/165,049, mailed on Aug. 23, 2013, Lattyak, "Providing Progressive Language Conversion for Digital Content on an Electronic Device", 16 pages.

Office Action for U.S. Appl. No. 13/308,825, mailed on Sep. 13, 2013, Inventor #1 Mehal H. Shah, "Controlling the Rendering of Supplemental Content Related to Electronic Books" 22 pages.

Ribiere, et al., "The sBook: Towards Social and Personalized Learning Experiences", ACM, 2010, pp. 3-8.

Wikipedia, "Computer File", retrieved on Aug. 16, 2013, at http://web.archive.org/web/20060915135156/http://en.wikipedia.org/wiki/File_%28computer%29, Wikimedia Foundation, Inc., 2006, 3 pages.

Final Office Action for U.S. Appl. No. 13/308,825, mailed on Mar. 31, 2014, Mehal H. Shah, Controlling the Rendering of Supplemental Content Related to Electronic Books, 18 pages.

Office action for U.S. Appl. No. 13/308,825, mailed on Jul. 24, 2014, Shah, "Controlling the Rendering of Supplemental Content Related to Electronic Books", 22 pages.

* cited by examiner

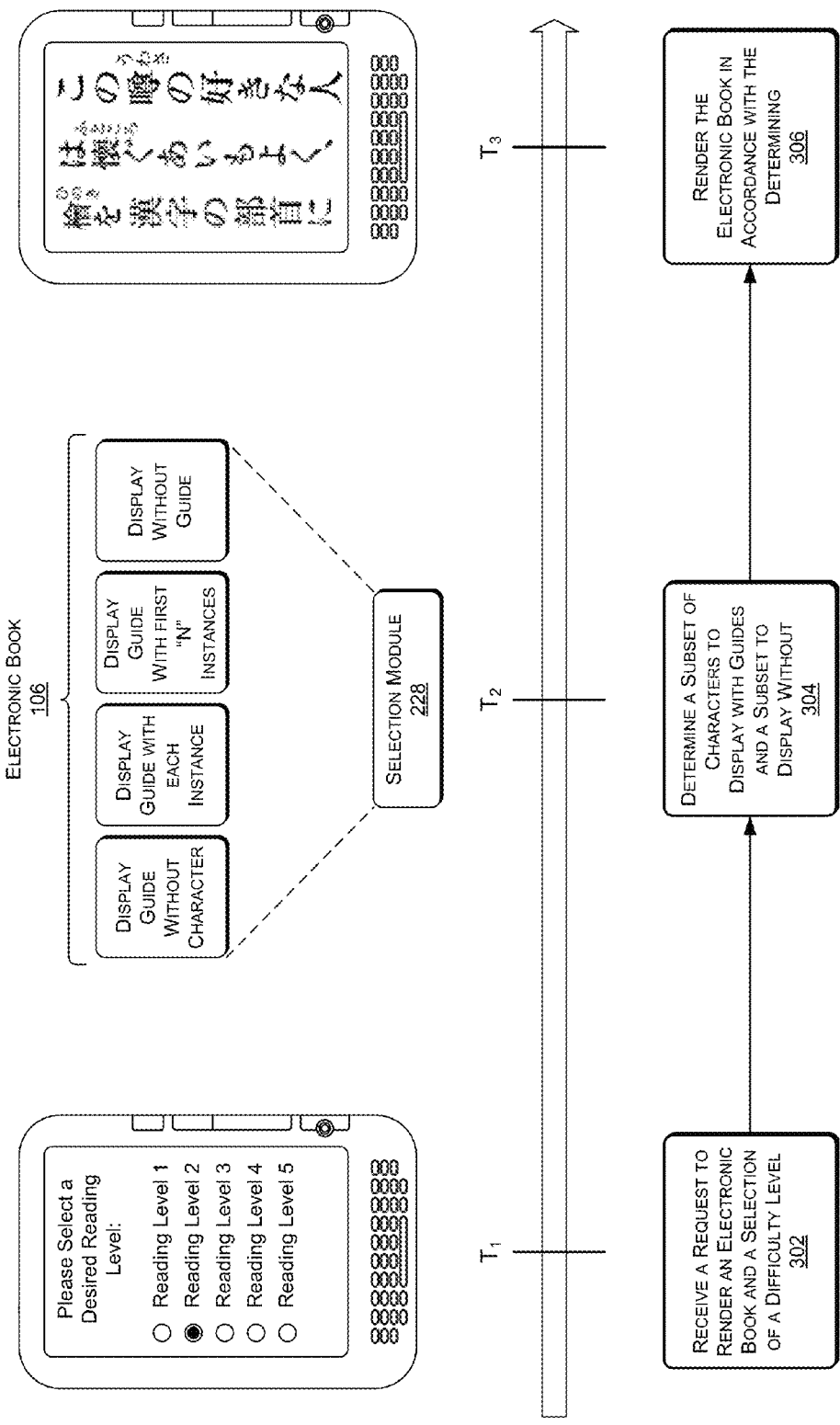

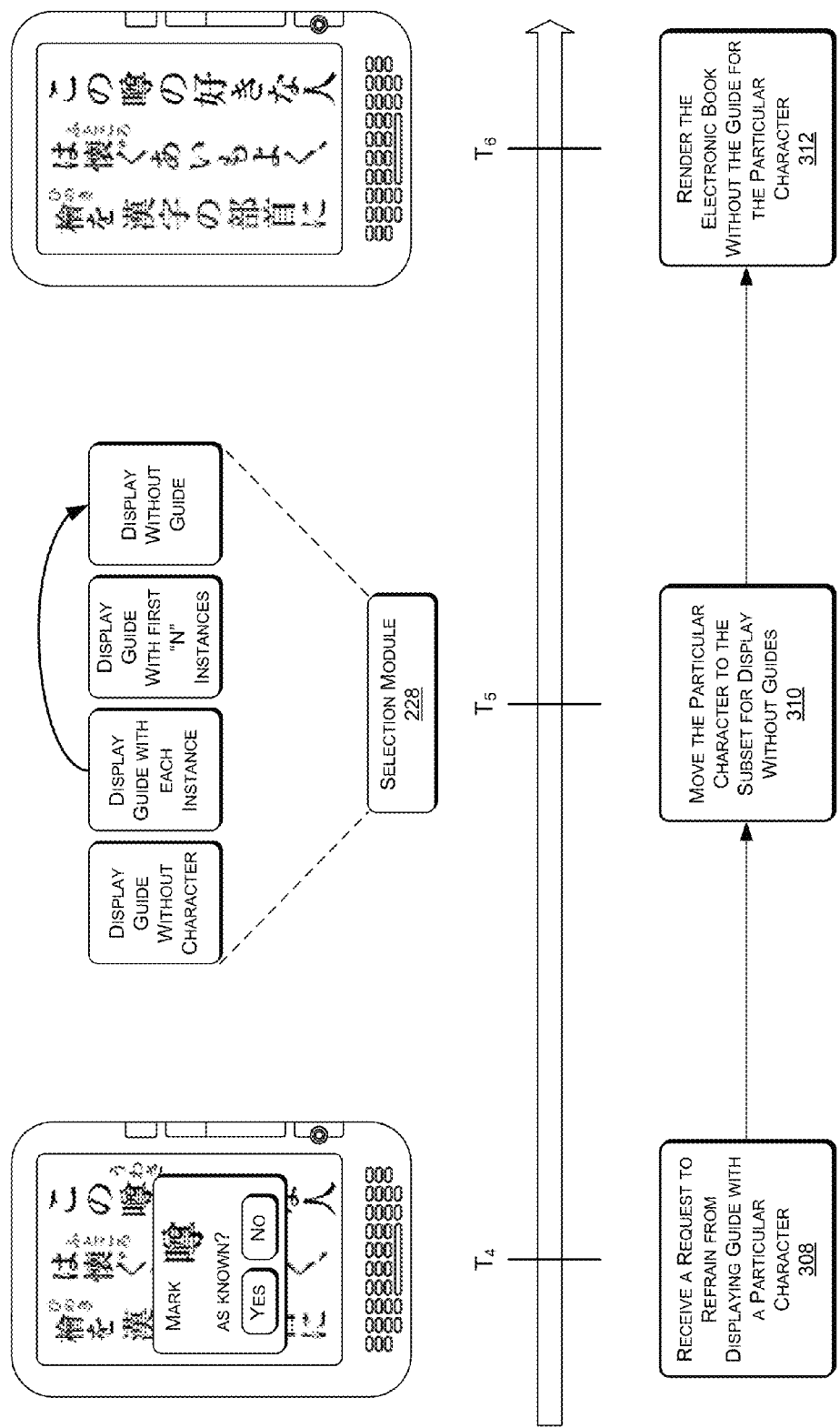

Fig. 3C

SELECTIVE DISPLAY OF PRONUNCIATION GUIDES IN ELECTRONIC BOOKS

BACKGROUND

Many languages, such as English, utilize phonographic characters that consist of phonemes (i.e., speech sounds). As such, people may learn to read these languages by first learning different phonemes and thereafter "sounding out" words of which they are unfamiliar. Other languages, meanwhile, utilize logographic characters (e.g., Kanji characters) that consist of visual symbols representing words rather than phonemes or sounds. As such, learning logographic characters within these languages requires memorization rather than simply sounding out the characters. Because of this, if a person does not recognize a logographic character, no practical way exists for the user to sound out or otherwise determine the pronunciation of the character without some external reference source, such as a dictionary. Some languages, such as Japanese, utilize a combination of phonographic characters and logographic characters.

Because of the difficulties associated with interpreting logographic characters, languages that use logographic characters often include ruby characters that act as pronunciation guides for individual logographic characters. For instance, when a book written in Japanese includes a logographic character, a set of ruby characters may reside adjacent to the logographic character such that a person reading the text is able to read these phonetic characters if the user does not recognize the logographic character.

While the inclusion of ruby characters helps people read otherwise opaque portions of text, the inclusion of ruby characters does present several problems. First, these ruby characters may become somewhat distracting if a reader already knows the logographic character. In addition, given the permanent nature of physical books, when a publisher prints a book the publisher must decide on an amount of ruby characters to include. After the publisher releases the book, however, readers of a relatively low reading level may find that the publisher included too few ruby characters, while readers of a relatively high reading level may find the ruby characters unnecessary and potentially distracting.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example electronic device that may selectively render pronunciation guides based on an aspect of a user utilizing the device, such as a reading level of the user, an age of the user, or the like.

FIGS. 3A-3D collectively illustrate an example flow diagram for selectively rendering pronunciation guides using the techniques described herein.

DETAILED DESCRIPTION

Overview

This disclosure describes, in part, techniques for selectively and dynamically determining an amount of pronunciation guides to display within an electronic book based at least in part on an aspect of a user reading the electronic book. For instance, an electronic device rendering an electronic book may determine whether to display some, all, or no pronunciation guides for characters within the electronic book based on a reading level of the user, an age of the user, a primary language of the user, or any other aspect that indicates the user's proficiency in the language of the electronic book.

The techniques are described below with reference to the following devices and processes. However, it is to be appreciated that a number of other devices may also employ these techniques. Furthermore, as used herein, the term "electronic book" or "eBook" may include any type of content which can be stored and distributed in digital form. By way of illustration, and without limitation, electronic books can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, images, and the like.

Figure 1A:
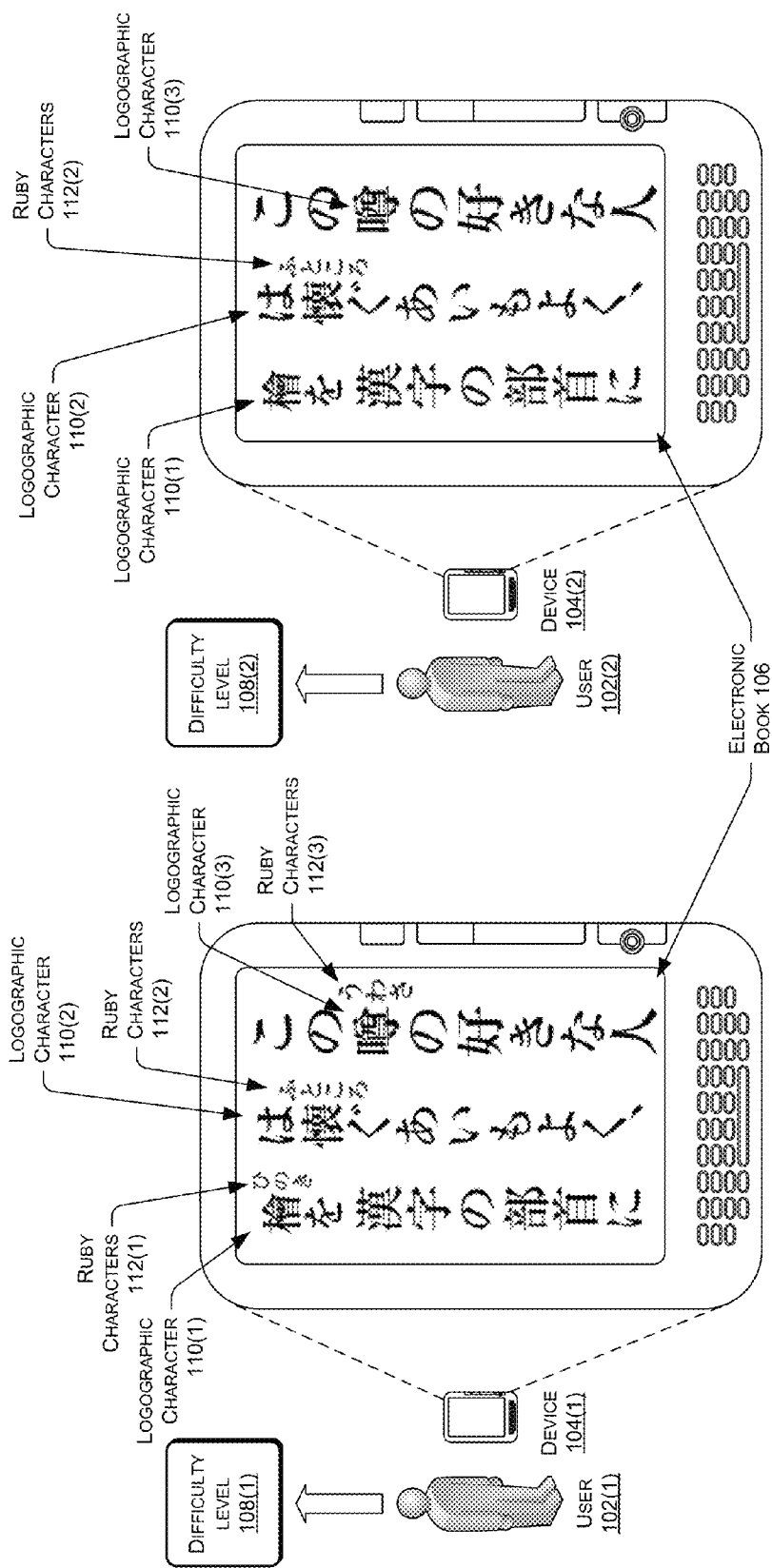
FIGS. 1A-1B illustrate two different examples where electronic devices may render an amount of pronunciation guides that is determined with reference to difficulty levels selected by users. In each of these example figures, two different users are reading the same electronic book according to different difficulty levels. Because the difficulty level selected by the first illustrated user is lower than the difficulty level selected by the second illustrated user, the device of the first user renders more pronunciation guides than does the device of the second user.

FIG. 1A illustrates a user 102(1) utilizing an electronic device 104(1) to read an electronic book 106, while a user 102(2) utilizes an electronic device 104(2) to read the same electronic book 106. As illustrated, the electronic book in this example is written in Japanese and, therefore, includes a combination of phonographic and logographic characters. In addition, a portion of the logographic characters are associated with ruby characters that appear adjacent to respective ones of the logographic characters. While these ruby characters appear to the right of the corresponding logographic characters, the ruby characters may reside atop corresponding logographic characters or in another location in other implementations.

As illustrated, the user 102(1) is associated with a difficulty level 108(1), while the user 102(2) is associated with a different difficulty level 108(2). In this example, the difficulty level 108(1) is lower than the difficulty level 108(2). Based on these different difficulty levels, the device 104(1) renders more ruby characters within the electronic book 106 than does the device 104(2). By rendering more ruby characters, the device 104(1) allows the user 102(1) to phonetically sound out more logographic characters with use of the ruby characters than compared to the user 102(2). Of course, while FIG. 1A illustrates displaying relatively fewer ruby characters for a relatively higher difficulty level, in some instances the techniques may display more and/or different ruby characters for a relatively higher difficulty level.

To illustrate, the device 104(1) renders a portion of the electronic book 106 that includes, in part, logographic characters 110(1), 110(2), and 110(3), as well as corresponding ruby characters 112(1), 112(2), and 112(3). In this example, the device 104(1) renders each set of ruby characters 112(1)-

(3) to the right of corresponding logographic characters 110 (1)-(3). With use of the ruby characters 112(1)-(3), the user 102(1) is able to phonetically sound out, and hence learn, the corresponding logographic characters 110(1)-(3). While FIG. 1A illustrates respective sets of ruby characters corresponding to a single logographic character, in other instances respective sets of ruby characters may correspond to two or more logographic characters (i.e., compound logographic characters).

The device 104(2), meanwhile, renders fewer ruby characters within the electronic book 106 than does the device 104(1), given that the user 102(2) is associated with a higher level of difficulty 108(2). In this example, the device renders the ruby characters 112(2) associated with the logographic character 110(1), while refraining from rendering the ruby characters 112(1) and 112(3) associated with the logographic characters 110(1) and 110(3), respectively. Therefore, the user 102(2) is able to phonetically sound out the logographic character 110(2), while the user 102(2) presumably already knows the logographic characters 110(1) and 110(3).

As illustrated, the devices 104(1) and 104(2) selectively display pronunciation guides (here in the form of ruby characters) based on the corresponding difficulty levels 108(1) and 108(2) of the users 102(1) and 102(2). These users 102(1) and 102(2) may have explicitly selected the difficulty levels, the devices may have determined the difficulty levels (e.g., with reference to an aspect of the user), or the difficulty levels may have been set in any other manner.

For example, the users 102(1) and 102(2) may have provided an input into the respective devices 104(1) and 104(2), which the devices may have used to determine the respective difficulty levels 108(1) and 108(2). For instance, the users may have indicated their respective reading levels in Japanese, their respective ages, their respective grade levels, their respective primary languages (e.g., Japanese, English, etc.), or may have provided any other input that the devices may utilize for determining the appropriate difficulty level at which to render the electronic book.

In another example, the devices may include physical or virtual controls (e.g., icons) that allow the users to increase and decrease the amount of pronunciation guides (e.g., ruby characters) rendered within the electronic book 106. For instance, the devices may include a physical or virtual dial that allows the user to increase or decrease the amount of the pronunciation guides as the user desires. To provide another example, the devices may query the user on the pronunciation or meaning of a series of characters (e.g., logographic characters) to determine their reading levels and, hence, the difficulty levels at which to render the electronic book.

Furthermore, as the proficiency of the users 102(1) and 102(2) in the Japanese language progresses, the devices may dynamically modify the corresponding difficulty levels 108 (1) and 108(2). In one example, after the users have learned the pronunciation of a particular logographic character, the users may select the logographic character and request that the device refrain from displaying ruby characters for subsequent instances of the logographic character in the electronic book 106. The users may make this selection via any sort of input component of the devices 104(1) and 104(2), such as via the illustrated keyboard, via a touchscreen, via audible commands, or in any other manner.

In another example, the devices 104(1) and 104(2) may determine how the users' proficiencies progress (or regress) and may alter the difficulty levels accordingly. For instance, the devices may periodically or randomly query the users' understanding of particular logographic characters and, as the users' understanding and memorization of these characters progress (or regress), may increase or decrease the difficulty level for the purpose of showing more or fewer ruby characters. For instance, if the user 102(1) indicates that she has now memorized a particular logographic character, the device 104 (1) may refrain from showing ruby characters for future instances of the particular logographic character.

In still another example, the devices 104(1) and 104(2) may determine the appropriate difficulty level for the users, or may determine the users' progress, with reference to the users' consumption of the electronic book on the devices 104(1) and 104(2). For instance, these devices may include cameras and corresponding technology for identifying the users' gaze on the device displays. If one of these cameras detects that the user's gaze remains on a particular character on the display for a long period of time, then the device may deduce that the user does not understand the particular character at which the user is looking. Conversely, if the user's gaze moves across a page of content relatively quickly, then the device may deduce that the user understands the characters on that page quite well. The device may then calculate the appropriate difficulty level for the user with reference to this information.

Figure 1B:
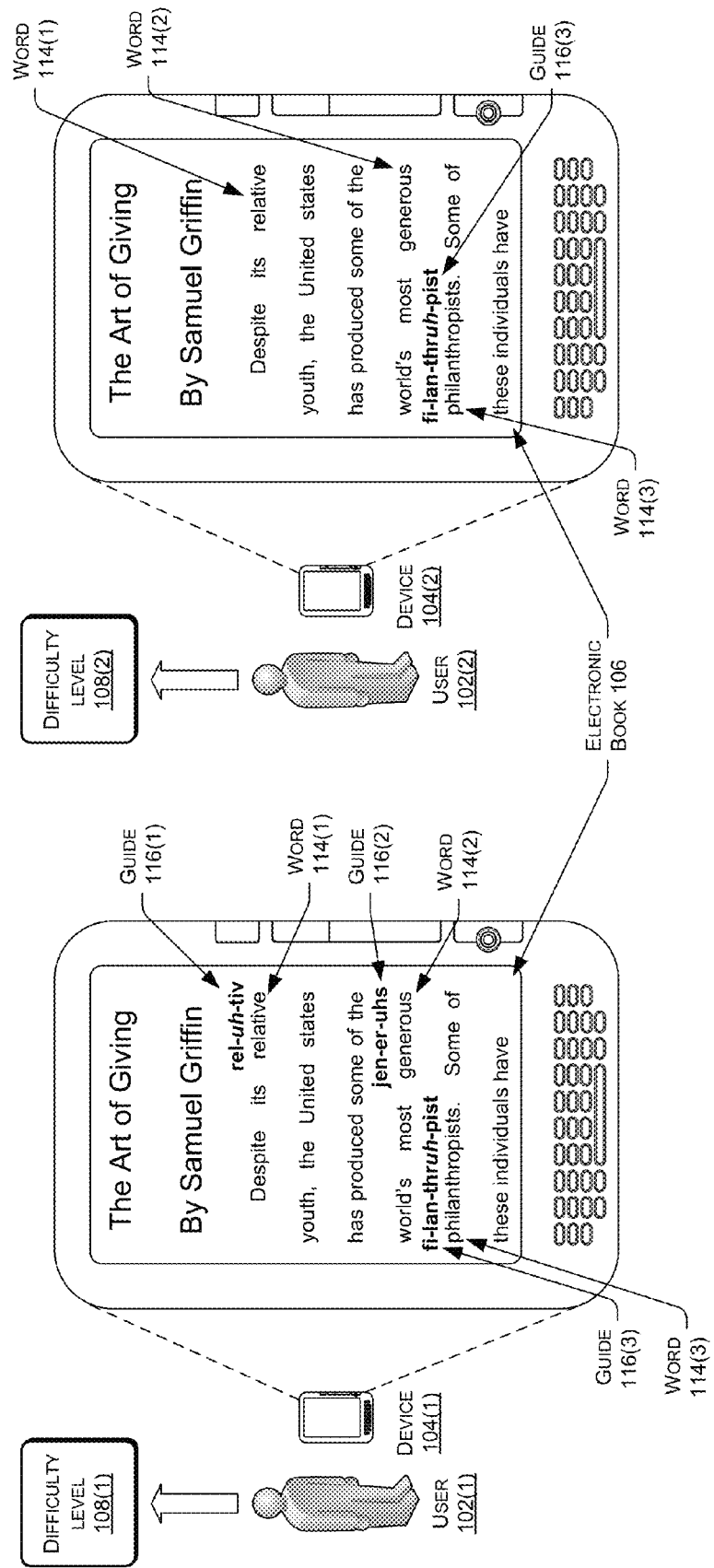

FIG. 1B illustrates another example where the devices 104(1) and 104(2) selectively display pronunciation guides based on difficulty levels 108(1) and 108(2) associated with the users 102(1) and 102(2). In this example, the users again read the same electronic book 106, although in this example the book is in English and, hence, the text of the book is made up of phonographic characters (e.g., phonetic words). Again, in this example the user 102(1) is associated with the difficulty level 108(1) that is less than the difficulty level 108(2) of the user 102(2). As such, the device 104(1) renders, amongst other characters, three words 114(1), 114(2), and 114(3), along with corresponding pronunciation guides 116(1), 116 (2), and 116(3).

In this example, the pronunciation guides 116(1)-(3) comprise phonemes that help the user to phonetically sound out the corresponding words 114(1)-(3). For instance, the device 104(1) includes the word "relative" and the corresponding pronunciation guide "rel-uh-tiv". By including these pronunciation guides, the user 102(1) is able to sound out the words and, over time, learn how to properly pronounce the words 114(1)-(3).

The user 102(2), meanwhile, remains associated with the relatively higher difficulty level 108(2). As such, the device 104(2) renders fewer pronunciation guides. For instance, the device may render pronunciation guides associated with relatively complex words, while refraining from rendering pronunciation guides for less complex words. Here, for instance, the device 104(1) renders the pronunciation guide 116(3) for "philanthropist", while refraining from rendering the pronunciation guides 116(1) and 116(2) for the words "relative" and "generous".

Example Electronic Device

Figure 2:
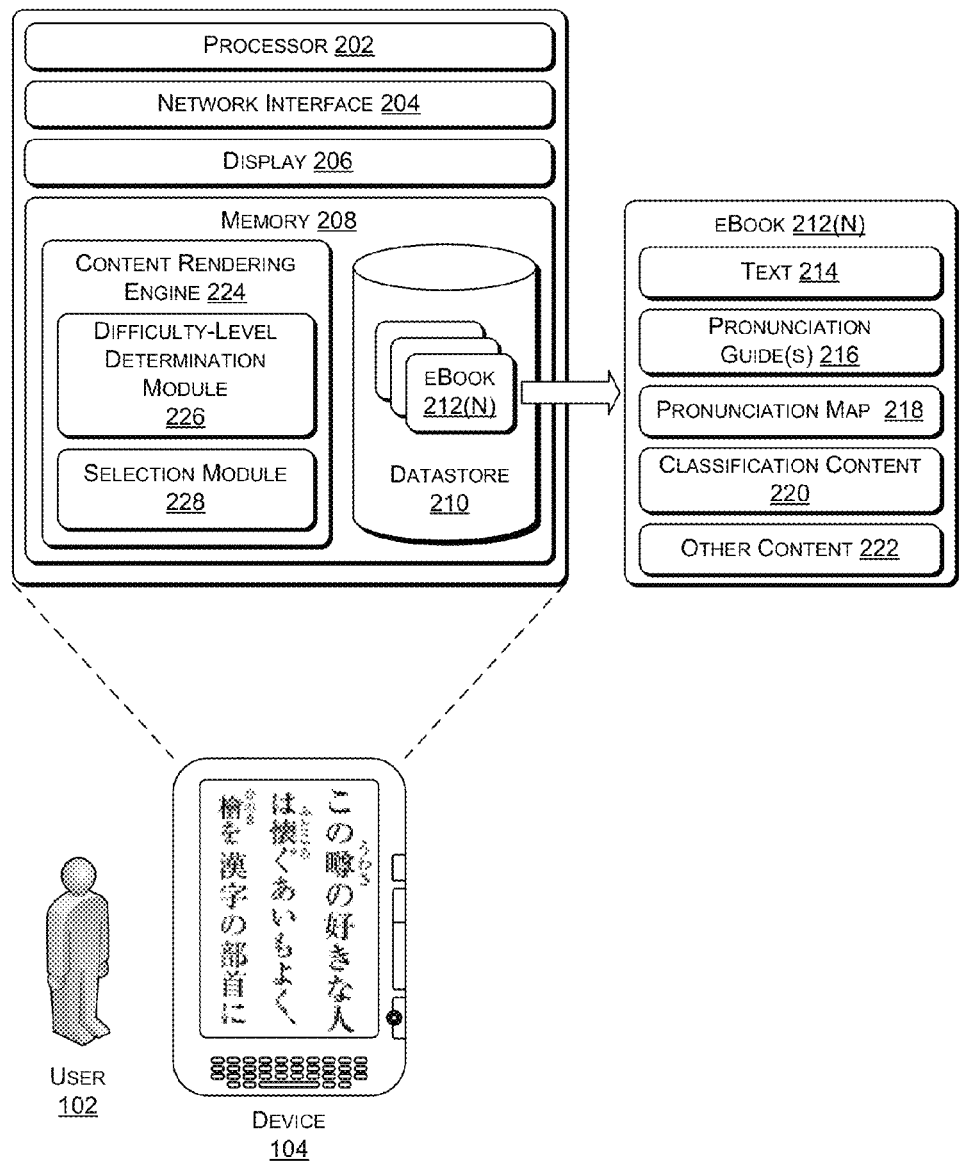

FIG. 2 illustrates, in greater detail, an example electronic device 104 that may selectively render pronunciation guides based on an aspect of a user 102 utilizing the device, such as a reading level of the user 102, an age of the user 102, or the like. While FIG. 2 illustrates the electronic device 104 as an electronic book reader, the device 104 may comprise any sort of device, such as a mobile phone, a multifunctional device, a desktop computer, a laptop computer, a game console, a personal media player, or the like. As illustrated, the device 104 includes one or more processors 202, one or more network interfaces 204, one or more displays 206, and memory 208. The device 104 may also include various additional components, such as one or more input devices that allow the user 102 to operate the device 104, an operating system, system busses, and the like.

The network interface 204 allows the electronic device 104 to communicate with content providers and other entities over networks, such as local-area networks (LANs), wide-area networks (WANs), the Internet, wireless networks, wireless wide-area networks (WWANs), cable television networks, telephone networks, cellular communications networks, combinations of the foregoing, and/or the like. The display 206, meanwhile, may comprise any sort of display for visually rendering electronic books, such as a liquid crystal display (LCD), a light-emitting diode (LED) display, an electronic paper display, or the like.

The memory 208 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

As illustrated, the memory 208 stores or otherwise has access to a datastore 210 that stores one or more electronic books 212(1), . . . , 212(N). The datastore 210 may store the electronic books 212(1)-(N) persistently or temporarily, as in the case where a content provider streams delivery of an electronic book being rendered the device 104(1). In either instance, FIG. 2 illustrates that the example electronic book 212(N) may include text 214, one or more pronunciation guides 216, a pronunciation map 218, classification content 220, and other content 222 of the book (e.g., images, videos, etc.).

The text 214 may comprise any combination of logographic (e.g., Kanji characters, etc.) and phonographic characters (e.g., English words, etc.). Furthermore, some or all of the these characters may correspond to respective pronunciation guides, which may comprise ruby characters, phonemes, or any other type of character that may help a reader better understand the pronunciation or meaning of a corresponding logographic or phonographic character. In some instances, the pronunciation guides 216 may comprise content that is configured to be output visually on a display (as described above with reference to FIGS. 1A and 1B), while in other instances the pronunciation guides 216 may comprise content that is configured to be output audibly on one or more speakers of the device 104.

The pronunciation map 218, meanwhile, may map the pronunciation guides to corresponding portions of the text 214. For instance, the pronunciation map 218 may link a particular set of ruby characters to a particular logographic character to which it corresponds. In another example, the pronunciation map 218 may map a series of English phonemes (e.g., "rel-uh-tiv") to a corresponding word (e.g., "relative").

In some instances, the pronunciation map 218 accompanies the text 214 of the eBook 212(N). For instance, when a publisher makes the eBook 212(N) available for acquisition, the publisher may include the pronunciation map 218 indicating how to pronounce the different characters within the text. In other instances, the device 104 or another entity (e.g., an entity that offers the eBook 212(N) for acquisition) may obtain the pronunciation map 218 from a third-party source. For instance, a reference source may maintain the different ruby characters or other types of pronunciation guides for the text 214. The device 104 or the other entity may then identify the characters (e.g., Kanji characters) within the text 214, obtain the corresponding pronunciation guides (e.g., ruby characters), and then store these guides as the pronunciation map 218. In still other instances, the device 104 or another entity (e.g., the entity that offers the eBook 212(N) for acquisition) may actually create the pronunciation guides for the different characters within the text 214 and store these pronunciation guides as the pronunciation map 218.

In addition, the pronunciation map 218 may maintain a count of a number of instances of different characters within the electronic book 212(N). For instance, the pronunciation map 218 may store an indication of number of a times that each of multiple different Kanji characters appear in the electronic book. This information may then be used to view a distribution of characters according to the character's frequency of use within the book 212(N). This distribution, in turn, may be used as a study guide of sorts. That is, the pronunciation map may make available a list of the most frequently used Kanji characters within the electronic book 212(N) such that the user 102 may focus her learning on these prevalent characters.

Finally, the classification content 220 may store indications of characters' difficulty levels for use in determining whether or not to render the pronunciation guides along with the different characters. For instance, the classification content 220 may identify, for one or more logographic characters and/or phonographic characters in the electronic book, a difficulty level of the character specified in terms of reading level, age, or the like.

In one particular example, the classification content 220 may specify a reading level (e.g., first-grade reading level, second-grade reading level, etc.) of each logographic or phonographic character. By classifying the characters in this manner, the device 104(1) is able to determine when to display the corresponding pronunciation guides, as described in further detail below.

In some instances, the classification content 220 accompanies the text 214 of the eBook 212(N). For instance, when a publisher makes the eBook 212(N) available for acquisition, the publisher may include the classification content 220 indicating the difficulty level of the different characters within the text. In other instances, the device 104 or another entity (e.g., an entity that offers the eBook 212(N) for acquisition) may obtain the classification content 220 from a third-party source. For instance, a reference source may maintain difficulty levels of respective characters, and the device 104 or the other entity may identify the characters within the text 214 and identify, from the reference source, the corresponding difficulty level of the characters. The device 104 may then store the difficulty levels as the classification content 220. In still other instances, the device 104 or another entity (e.g., the entity that offers the eBook 212(N) for acquisition) may actually calculate the difficulty levels of the different characters within the text 214 and store these difficulty levels as the classification content 220.

The memory 208 also stores or has access to a content rendering engine 224, which in turns stores or has access to a difficulty-level determination module 226 and a selection module 228. The content rendering engine 224 functions to render the electronic books 212(1)-(N) on the display 206 of the device 104 and/or on other output components of the device 104 (e.g., speakers, etc.). The difficulty-level determination module 226, meanwhile, functions to determine a difficulty level at which to render a particular electronic book, based on an aspect of the user or otherwise.

For instance, when the user 102 requests to render the electronic book 212(N) on the display 206, the module 226 may determine a difficulty level at which to render the electronic book 212(N). In some instances, the module 226 may make this determination with reference to an aspect of the user, such as a reading level of the user 102, a grade level of the user 102, an age of the user 102, a primary language of the user 102, or the like. The user 102 may specify this aspect when requesting to render the electronic book 212(N) or prior to requesting to render the electronic book, or the module 226 may determine this information in any other way (e.g., by querying the user regarding their understanding of certain characters within the book or another book).

In still another example, the module 226 may determine the difficulty level at which to render the electronic book 212(N) at least partly with reference to a primary language specified by the user 102 and a language of the electronic book 212(N). For instance, if the electronic book 212(N) is written in Japanese and the user 102 specifies English as the user's primary language, then the module 226 may set the difficulty level relatively low.

Based on the determined difficulty level coupled with the classification content 220, the selection module 228 may determine a subset of characters of the book 212(N) to render with corresponding pronunciation guides and a subset of characters of the book 212(N) to render without corresponding pronunciation guides.

For instance, if the user provides an indication that the user is able to read at a ninth-grade reading level, then the selection module 228 may compare this inputted reading level to the classifications of the text 214 of the electronic book 212(N). In this example, the module 228 may render pronunciation guides for some or all of the characters of the text 214 that are above a ninth-grade reading level, while refraining from rendering pronunciation guides for some or all characters of the text 214 that are at or below the ninth-grade reading level.

Furthermore, the selection module 228 may create additional subsets in some implementations. For instance, the selection module 228 may refrain from displaying pronunciation guides for any instances of characters that are classified as being below the user's reading level by a relatively large amount. For example, the module 228 may determine that a particular Kanji character is associated with a second-grade reading level—well below the user's ninth-grade abilities—and may therefore refrain from displaying ruby characters for any instances of this Kanji character within the electronic book 212(N).

Additionally, the selection module may identify characters that are much nearer or at the user's reading level. For instance, the module 228 may determine that a particular Kanji character is associated with an eight- or ninth-grade reading level. As such, the module 228 may cause display of ruby characters for a first "N" instances of the character within the electronic book 212(N), where N is any number greater than zero. As such, the techniques still aid the user 102 in an appropriate manner while assuming that the user 102 will eventually learn the Kanji character that is at or near the user's reading level.

Furthermore, the module 228 may also identify Kanji characters having classified reading levels that are a threshold amount above the user's reading level. For instance, the module 228 may identify a Kanji character that is classified as being at a tenth-grade reading level. In response, the module 228 may place this character into a subset of characters for which the module 228 will render the corresponding ruby characters for "M" instances of the character, where M is any number greater than N. Because this character is above but still near the user's reading level, the module 228 may display the ruby characters for a certain amount of time while refraining from displaying these ruby characters later in the book 212(N), thus encouraging the user to increase her reading level.

In yet another example, the module 228 may identify Kanji characters that are well above the user's reading level. For instance, the module 228 may identify a Kanji character that is associated with a twelfth-grade reading level. For this and other similarly-situated characters, the selection module 228 may cause display of the corresponding ruby characters in lieu of (i.e., without) the Kanji character itself.

While a few example subsets have been discussed, it is to be appreciated that the selection module may create or define more or fewer subsets of characters in other implementations. Regardless of the number of subsets of characters, the content rendering engine 224 may render the electronic book 212(N) in accordance with the subsets selected by the selection module 228. For instance, the rendering engine 224 may display the electronic book 212(N) on the display, with some of the characters including the pronunciation guides for each instance of the characters, some including the guides for a number of instances that is less than each instance of the character, and some not including the guides at all. In addition, the rendering engine 224 may display some of the pronunciation guides without the corresponding characters.

While FIG. 2 illustrates one example device, it is to be appreciated that multiple other devices and architectures may implement the described techniques. For instance, the components illustrated as being located on or accessible to the device 104 may be located in any other location, such as on one or more of servers that are accessible to the device over a network, spread out amongst additional servers, located on other electronic devices, and/or the like.

Example Operation

FIGS. 3A-3D collectively illustrate an example flow diagram 300 for selectively rendering pronunciation guides using the techniques described herein. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 302, an electronic device receives a request to render an electronic book and a selection of a level of difficulty at which to render the electronic book. As discussed above, a user may select this level of difficulty explicitly (e.g., by specifying a reading level,), or the user may make this selection implicitly (e.g., by providing an age of the user, a grade level of the user, based on the user's answers to certain language proficiency questions displayed by the device, etc.).

After the device receives the request and the selection, at 304 the device may determine a subset of the logographic or phonographic characters to display with corresponding pronunciation guides and a subset of the characters to display without corresponding pronunciation guides. As described above, the device may determine these subsets by comparing the selected difficulty level with classifications of the characters within the electronic book. Furthermore and also as discussed above, the device may define further subsets, such as a subset of characters for which to display corresponding pronunciation guides for a particular number of instances of the characters, and the like.

At 306, the device then renders the electronic book in accordance with the determining at 304. For instance, the device may render some characters with corresponding pronunciation guides while rendering some characters free from corresponding pronunciation guides.

FIG. 3B continues the illustration of the flow diagram 300 and includes, at 308, the device receiving a request from a user to refrain from displaying a pronunciation guide associated with a particular character. For instance, a user that is reading the electronic book may come across a Kanji character (or other type of character) that she already knows or that she has learned through utilizing the ruby characters rendered within the electronic book. In response, the user may request that the device cease displaying the ruby characters for this particular Kanji character. The user may make this request by selecting the character in any suitable manner, such as via a keyboard, touchscreen, microphone, or any other input component of the device. As illustrated, the device may, in response, render a menu confirming the user's intention to cease display of the pronunciation guide for future instances of the character, either within the rendered electronic book and/or within any electronic books subsequently rendered for the user.

In response to receiving the request to refrain from displaying the pronunciation guide for a particular character, at 310 the device moves the particular character from the subset of characters for which guides are displayed and to the subset of characters for which guides are not displayed. As such, the device will refrain from displaying these guides when the device encounters future instances of this particular character within the electronic book (and potentially within other electronic books subsequently rendered on the display for the user). At 312, the device corresponding renders the electronic book without the guide for the particular character. For instance, the device may remove the pronunciation guide from the page of content from which the user issued the request.

While this example illustrates the user requesting to mark a single Kanji character as known, in instances where two or more Kanji characters form a compound character the user may request to mark a single compound character as known. For instance, if a first and a second Kanji character are displayed next to each other within an electronic book to form a compound Kanji character, the user may request to mark the compound character as known. As such, the device would refrain from displaying ruby characters for future instances of the compound character. However, marking this compound character as known would not affect whether or not the device displays ruby characters for future instances of the first or the second Kanji characters individually.

In addition, in some instances a Kanji character (and other types of logographic characters) may be associated with different types of pronunciations and/or meanings. As such, a single Kanji character may map to multiple different sets of ruby characters (or other types of pronunciation guides) based on the particular pronunciation or meaning of the Kanji. As such, in response to a user requesting to mark a particular Kanji character as known for one pronunciation of multiple different pronunciations of the Kanji character, the device may refrain from displaying ruby characters for future instances of the Kanji character having that particular pronunciation. However, the device may continue to display ruby characters for other pronunciations of that Kanji character that the user has not marked as known.

Figure 3C:
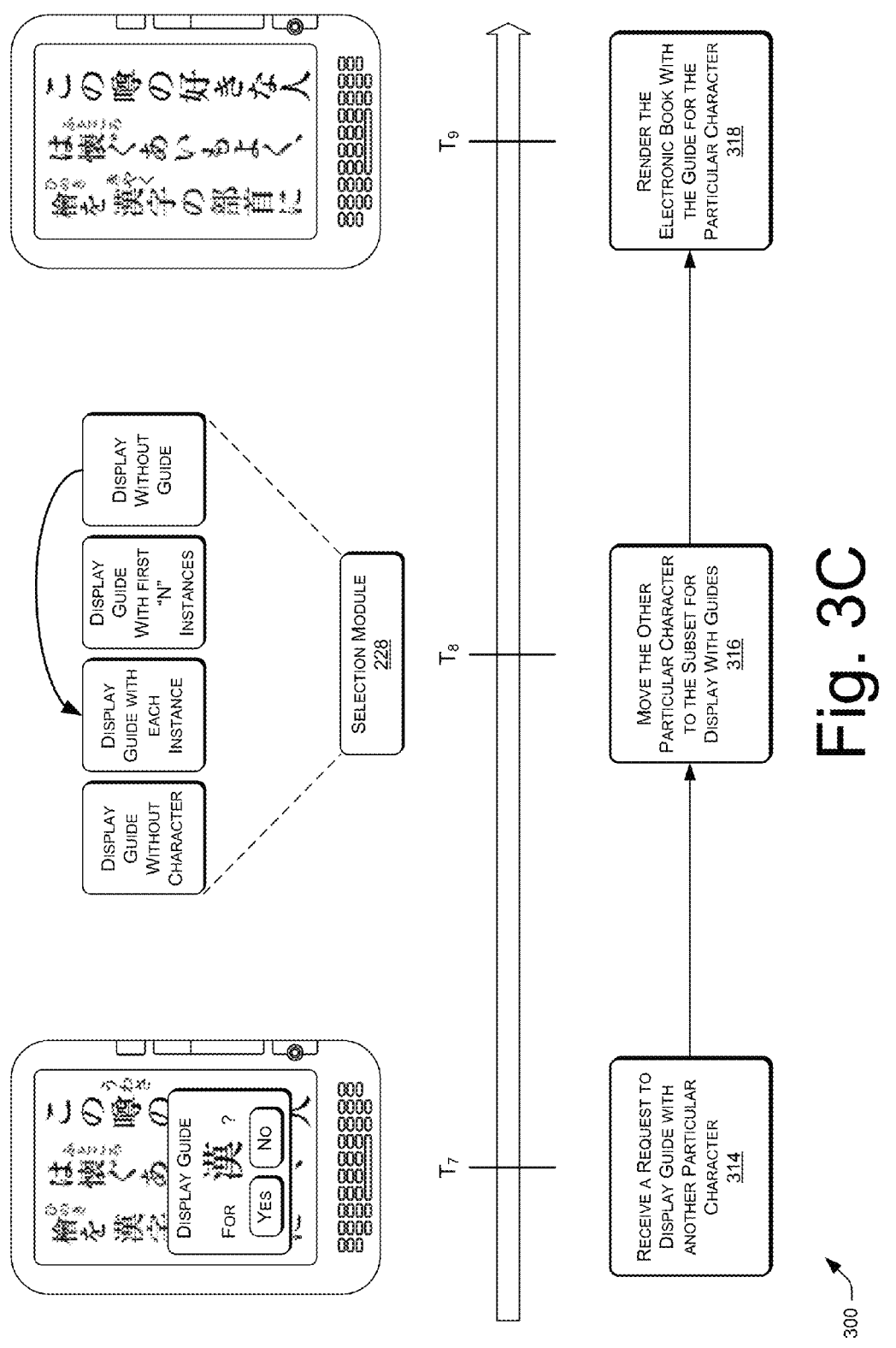

FIG. 3C continues the illustration of the flow diagram 300 and includes, at 314, receiving a request to display a pronunciation guide with a different particular character. For instance, when reading the illustrated electronic book, the user may encounter a particular Kanji character that the user doesn't recognize and for which the device does not currently display a pronunciation guide. Upon encountering this character, the user may select the character via any of the selection means discussed above and may request that the device display a pronunciation guide for this instance of the character and for future instances of the character within the electronic book (and potentially within electronic books subsequently rendered for the user).

At 316, and in response to the request received at 314, the device moves this particular character from the subset of characters to display without corresponding pronunciation guides and to the subset of characters to display with corresponding pronunciation guides. At 318, the device then renders the electronic book to include the pronunciation guide for that instance and for future instances of the particular character within the electronic book.

Figure 3D:
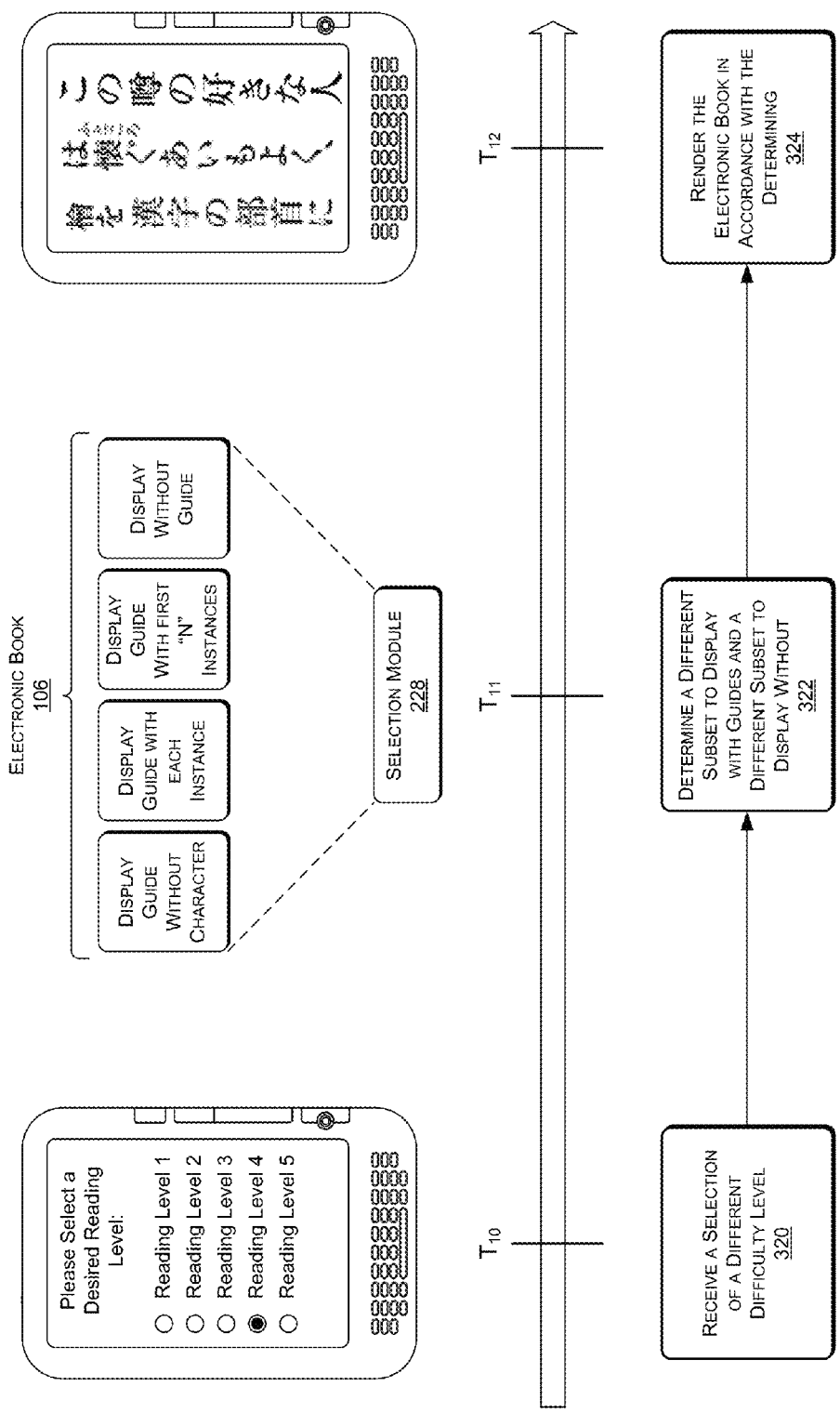

FIG. 3D concludes the illustration of the flow diagram 300 and includes, at 320, receiving a selection of a different difficulty level at which to render the electronic book. For instance, the request may be received explicitly from the user reading the electronic book. That is, the user may request that the device include more or fewer pronunciation guides by, for example, specifying a different reading level.

Conversely, the request may be received in response to a second user that reads at a different reading level operating and authenticating with the device. In either instance, in response receiving the selection, at 322 the device may determine a different subset of characters to display with corresponding pronunciation guides and a different subset of characters to display without corresponding pronunciation guides. As described above, the device may determine these subsets by comparing the newly selected difficulty level with classifications of the characters within the electronic book. Furthermore and also as discussed above, the device may define further subsets, such as a subset of characters for which to display corresponding pronunciation guides for a particular number of instances of the character, and the like.

At 324, the device then renders the electronic book in accordance with the determining of the different subsets at 322. For instance, the device may render some characters with corresponding pronunciation guides while rendering some characters free from corresponding pronunciation guides. In the illustrated example, the difficulty level selected at 320 is a higher reading level than that selected at 302 and, therefore, the device renders fewer pronunciation guides in this example.

As shown in FIG. 3C, the device may render more, fewer, and/or different pronunciation guides based on the different difficulty levels at which a user reads the electronic book. In addition, the device may allow a user to turn off use of all pronunciation guides within the electronic book and/or to display each pronunciation guide available for the electronic book. As such, the user may request that the device toggle between displaying an amount of pronunciation guides determined by a current selected difficulty level, displaying all pronunciation guides available for text of the electronic book, and refraining from displaying any of the pronunciation guides for the text of the electronic book.

Figure 4:
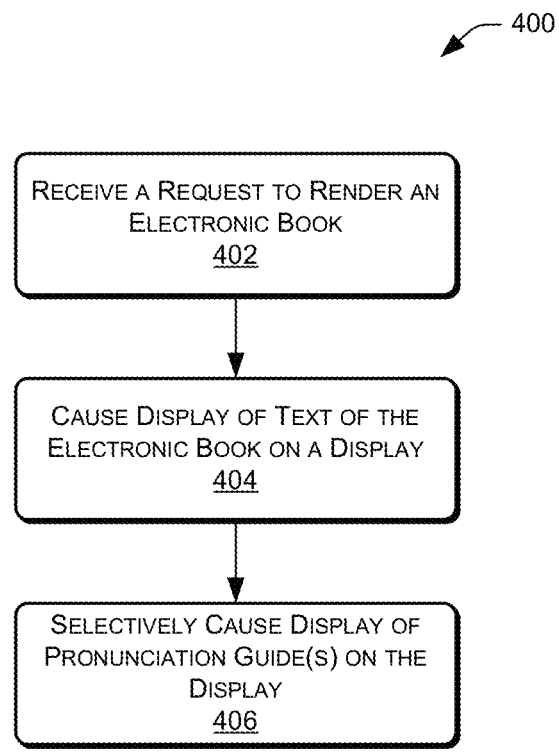
FIG. 4 illustrates an example process for selectively displaying pronunciation guides based on a reading level of a user.

FIG. 4 illustrates an example process 400 for selectively displaying pronunciation guides based on a reading level of a user. At 402, an electronic device receives a request from a user to render an electronic book on a display of the device. This user may be associated with a particular reading level that the user explicitly specifies to the device, that the device calculates based on one or more aspects of the user (e.g., age, grade level, primary language, etc.), or the like.

At 404, and in response, the device causes display of text of the electronic book on the display. As described above, this text may comprise phonographic characters (e.g., words), logographic characters (e.g., Kanji characters), or a combination thereof. Finally, at 406, the device selectively causes display of one or more pronunciation guides corresponding to individual words or characters of the text based at least in part on the reading level of the user, as described and illustrated above.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   under control of an electronic device that includes a display and is configured with executable instructions,
   receiving a request to display an electronic book that includes logographic characters and ruby characters corresponding to respective ones of the logographic characters; and
   at least partly in response to receiving the request:
      selecting a subset of the logographic characters to display with corresponding ruby characters, wherein the selecting the subset of the logographic characters to display with corresponding ruby characters comprises at least:
         selecting a first logographic character to display with corresponding ruby characters for a first number of instances of the first logographic character in the electronic book; and
         selecting a second, different logographic character to display with corresponding ruby characters for a second, different number of instances of the second logographic character in the electronic book;
      wherein a remainder of the logographic characters are to be displayed without corresponding ruby characters; and
      displaying the electronic book on the display of the electronic device in accordance with the selecting.

2. A method as recited in claim 1, wherein the request to display the electronic book is received from a user and the selecting of the subset is based at least in part on an aspect of the user.

3. A method as recited in claim 2, wherein the aspect of the user comprises an age of the user, a reading level of the user, a grade level of the user, or a primary language of the user.

4. A method as recited in claim 1, wherein the request to display the electronic book is received from a first user, and further comprising:
   after displaying the electronic book, receiving a request from a second, different user to display the electronic book; and
   at least partly in response to receiving the request from the second user:
      selecting a different subset of the logographic characters to display with corresponding ruby characters; and
      displaying the electronic book on the display of the electronic device in accordance with the selecting of the different subset.

5. A method as recited in claim 1, wherein the first number of instances includes each instance of the first logographic character in the book and the second number of instances includes less than each instance of the second logographic character in the book.

6. A method as recited in claim 1, further comprising:
   receiving a request to display additional ruby characters in the electronic book; and
   at least partly in response to receiving the request to display additional ruby characters, increasing a number of the logographic characters included in the subset of the logographic characters to display with corresponding ruby characters.

7. A method as recited in claim 1, further comprising:
   receiving a request to display fewer ruby characters in the electronic book; and
   at least partly in response to receiving the request to display fewer ruby characters, decreasing a number of the logographic characters included in the subset of the logographic characters to display with corresponding ruby characters.

8. A method as recited in claim 1, further comprising:
   receiving a request to cease displaying ruby characters corresponding to a particular logographic character in the electronic book; and
   at least partly in response to receiving the request to cease displaying the ruby characters corresponding to the particular logographic character, removing the particular logographic character from the subset of the logographic characters to display with corresponding ruby characters, wherein the particular logographic character is included with the remainder of the logographic characters to display without corresponding ruby characters.

9. A method as recited in claim 1, further comprising:
   receiving a request to begin displaying ruby characters corresponding to a particular logographic character in the electronic book; and
   at least partly in response to receiving the request to begin displaying the ruby characters corresponding to the particular logographic character, including the particular logographic character in the subset of the logographic characters to display with corresponding ruby characters.

10. A method as recited in claim 1, further comprising:
    receiving a request to cease display of ruby characters within the electronic book; and
    displaying the electronic book on the display of the electronic device free from ruby characters at least partly in response to receiving the request to cease the display of the ruby characters.

11. A method as recited in claim 1, further comprising:
    receiving a request to display ruby characters for all logographic characters having corresponding ruby characters within the electronic book; and
    displaying the electronic book on the display of the electronic device in accordance with the request.

12. An electronic device, comprising:
a display;
one or more processors;
memory, storing instructions that when executed by the one or more processors cause the one or more processors to perform acts comprising:
receiving a request to display an electronic book that includes logographic characters and ruby characters corresponding to respective ones of the logographic characters; and
at least partly in response to receiving the request:
selecting a subset of the logographic characters to display with corresponding ruby characters, wherein the selecting the subset of the logographic characters to display with corresponding ruby characters comprises at least:
selecting a first logographic character to display with corresponding ruby characters for a first number of instances of the first logographic character in the electronic book; and
selecting a second, different logographic character to display with corresponding ruby characters for a second, different number of instances of the second logographic character in the electronic book;
wherein a remainder of the logographic characters are to be displayed without corresponding ruby characters; and
displaying the electronic book on the display in accordance with the selecting.

13. An electronic device as recited in claim 12, wherein the request to display the electronic book is received from a user and the selecting of the subset is based at least in part on an aspect of the user.

14. An electronic device as recited in claim 13, wherein the aspect of the user comprises an age of the user, a reading level of the user, a grade level of the user, or a primary language of the user.

15. An electronic device as recited in claim 12, wherein the request to display the electronic book is received from a first user, and wherein the processor-executable instructions further program the one or more processors to:
after displaying the electronic book, receive a request from a second, different user to display the electronic book; and
at least partly in response to receiving the request from the second user:
selecting a different subset of the logographic characters to display with corresponding ruby characters; and
displaying the electronic book on the display in accordance with the selecting of the different subset.

16. An electronic device as recited in claim 12, wherein the first number of instances includes each instance of the first logographic character in the book and the second number of instances includes less than each instance of the second logographic character in the book.

17. An electronic device as recited in claim 12, wherein the processor-executable instructions further program the one or more processors to:
receive a request to display additional ruby characters in the electronic book;
and at least partly in response to receiving the request to display additional ruby characters, increasing a number of the logographic characters included in the subset of the logographic characters to display with corresponding ruby characters.

18. An electronic device as recited in claim 12, wherein the processor-executable instructions further program the one or more processors to:
receive a request to display fewer ruby characters in the electronic book; and
at least partly in response to receiving the request to display fewer ruby characters, decreasing a number of the logographic characters included in the subset of the logographic characters to display with corresponding ruby characters.

19. An electronic device as recited in claim 12, wherein the processor-executable instructions further program the one or more processors to:
receive a request to cease displaying ruby characters corresponding to a particular logographic character in the electronic book; and
at least partly in response to receiving the request to cease displaying the ruby characters corresponding to the particular logographic character, remove the particular logographic character from the subset of the logographic characters to display with corresponding ruby characters, wherein the particular logographic character is included with the remainder of the logographic characters to display without corresponding ruby characters.

20. An electronic device as recited in claim 12, wherein the processor-executable instructions further program the one or more processors to:
receive a request to begin displaying ruby characters corresponding to a particular logographic character in the electronic book; and
at least partly in response to receiving the request to begin displaying the ruby characters corresponding to the particular logographic character, including the particular logographic character in the subset of the logographic characters to display with corresponding ruby characters.

21. An electronic device as recited in claim 12, wherein the processor-executable instructions further program the one or more processors to:
receive a request to begin displaying ruby characters corresponding to a particular logographic character in the electronic book; and
at least partly in response to receiving the request to begin displaying the ruby characters corresponding to the particular logographic character, including the particular logographic character in the subset of the logographic characters to display with corresponding ruby characters.

22. An electronic device as recited in claim 12, wherein the processor-executable instructions further program the one or more processors to:
receive a request to cease display of ruby characters within the electronic book; and
display the electronic book on the display free from ruby characters at least partly in response to receiving the request to cease the display of the ruby characters.

23. An electronic device as recited in claim 12, wherein the processor-executable instructions further program the one or more processors to:
receive a request to display each available ruby character within the electronic book; and
display the electronic book on the display with each available ruby character at least partly in response to receiving the request to display each available ruby character.

* * * * *